July 24, 1951

E. P. HOYLE 2,561,699

DUPLEX FISHING LINE CARTON

Filed June 24, 1948

EGBERT P. HOYLE
INVENTOR.

BY Louis Illmer
ATTORNEY

Patented July 24, 1951

2,561,699

UNITED STATES PATENT OFFICE 2,561,699

DUPLEX FISHING LINE CARTON

Egbert P. Hoyle, Cortland, N. Y., assignor to The Cortland Line Company, Inc., Cortland, N. Y., a corporation of New York Application June 24, 1948, Serial No. 34,883

1 Claim. (Cl. 206—59)

The present invention relates to a simple, compact carton or the like dual coil wrapper, preferably embodying an initially unitary tubular casing jacket that intermediate its ends, may be scored by an encircling severable incision line; when split apart, this provides for two or more jacket sections. Telescopically entered in tandem within such unitary jacket, are a plurality of sleeves or drawerlike components that may respectively be made to serve as separable coil and flanged spool holding receptacles when said jacket is split into sections.

The aim herein is to selectively allocate a long continuous strand into individually wrapped shorter coil lengths to satisfy trade requirements.

Such multiple coil groups may be fashioned from a uniformly continuous fishing line strand without knots or splices arranged to afford a masked coil interconnection or lead length that can be conveniently severed when exposed to view.

Casting lines or the like are generally sold to the trade in either 50 or 100 yard standardized lengths, depending upon the buyer's preference. As a commodity, such separate packaging requirement has heretofore complicated the stocking and commercial handling of fishing lines by mail order houses, jobbers and retail dealers. In order to more profitably service a chosen fishing line length, I have devised an improved duplex carton containing two or more strand interconnected spools, each having a prescribed length of line coiled thereon that are initially stowed in a single container provided with scored means disposed between adjacent line carrying spools. By cracking my duplex carton along a scored parting region over a table edge or the like, such several spools may readily be split apart to permit each short length line spool to be sold independently in a wrapped condition. It is preferred to so label each spool and their respective carton exteriors as to properly identify the strand product. Such individually wrapped spool components make for a neat and wholly filled package that materially expedites cited sales purposes.

The object of my invention is to provide for a refined coil carrying spool of the indicated character of which all elements may be economically fabricated and serviced. Embodied herein are also certain aspects organized to promote the sales end in view, and all of which novel features will hereinafter be more fully set forth.

Reference is had to the accompanying one sheet of drawings which are illustrative of a preferred exemplification, and in which drawings.

The style of coil container disclosed, may comprise a single tubular casing jacket 10 having an overall length approximately twice its width and of which the cross-sectional profile is given an oblong shape having a height somewhat greater than the flange spacing of a comparatively short strand carrying spool. Said jacket may be formed from cardboard with overlapping longitudinal flap edges. Intermediate its open ends, such jacket may be scored by an endless transverse incision line 11 disposed to allow an initially unitary jacket to be broken apart into the split sections such as 10A and 10B, the location of said line 11 being schematically indicated by dotted and dashed outline.

Figure 1:
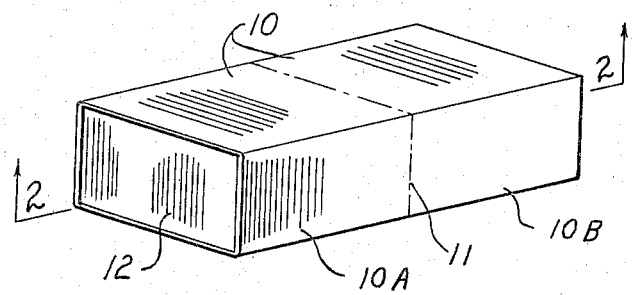
Fig. 1 represents a perspective view of a duplex fishing line carton, and Fig. 2 reveals a cross-section of such assembly taken along 2—2 of Fig. 1.
Figure 2:
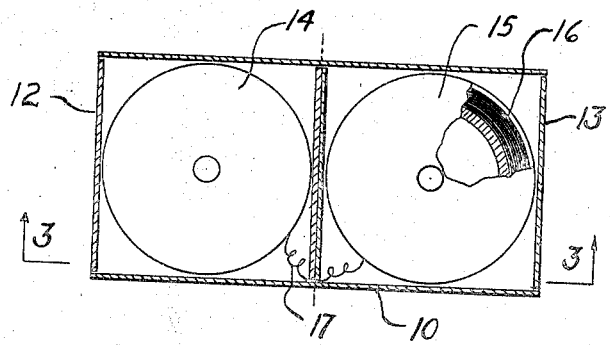

Separate drawers or the like box-shaped carton components 12 and 13 may be snugly telescoped in tandem into the opposite open end regions of the jacket 10 as shown. The respective next adjacent end walls of such pair of mated drawer components may be shifted to bring them into substantial registry with the incision line 11 (see Figs. 2 and 3). A strand carrying spool 14 or 15 respectively may be inclosed within each drawer component and have a common continuous fishing line strand 16 coiled around both of said spools to leave an initially concealed medial interconnecting strand length or severable short lead 17 that becomes exposed to view when the jacket sections 10A and 10B are split apart. The hub of my flanged spool as individually mounted in each drawer, may respectively have the opposite terminal region of a continuous fishing line wrapped about next adjacent spool hubs. A medial lead interconnection of such common line tangentially spans the outer coils of these next adjacent spools and is initially disposed wholly within the non-split jacket 10. Such lead is herein preferably confined beneath the radius size given to the spool flanges.

Figure 4:
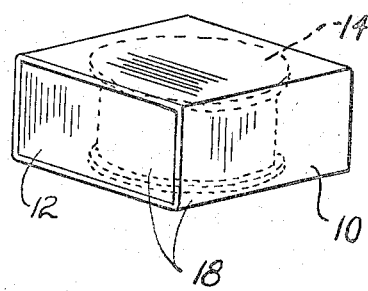
Fig. 4 shows in perspective, a severed carton unit that wraps a single coil carrying spool.

It will be observed that the open ends of each carton section are purposely placed in right angular relation to the corresponding open ends of its sleeve 12 or 13 so as to afford a complete enclosure for each separated spool. After said short lead length 17 is severed, this allows each protectively wrapped spool to be individually sold in half line length cartons 18 in the Fig. 4 fashion.

Figure 3:
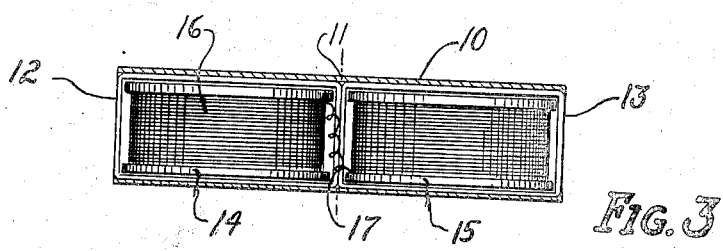
Fig. 3 is a cross-section of said assembly prior to the severing of my jacket score line.

It will be evident however, that where a customer desires to buy a full line length, the unbroken carton assembly is intended to be sold in its entirety as shown in Fig. 3. If desired, either of my spools may be reused to stow a fishing line thereon without having to discard its container.

The described packaging innovation materially facilitates supplying the trade with alternative fishing line lengths that when purchased are respectively neatly wrapped with the minimum of handling costs in filled cartons. My unitary container jackets together with their coil wrapped spools may be uniformly stacked without superficial jacket defacement in compact rows for warehouse storage or be exhibited as a salesroom commodity for ready dispensing to individual customers in selective standardized lengths. The afforded marketing advantages will be apparent to those skilled in this art, and it is to be understood that equivalent structural changes may be resorted to in attaining a like result, all without departing from the spirit and scope of my invention as characterized by the appended claim.

I claim:

A duplex fishing line marketing carton comprising a stackable initially unitary jacket member having an elongated tubular shape that is rectangular in cross-sectional profile, a pair of boxlike drawer components tandem mounted to slide in said jacket and which drawers respectively include an end wall that are contiguously juxtaposed, scored means extending about the axis of said jacket in substantial registry with said wall to allow of medially splitting said jacket into inclosed dual drawer holding sections, a flanged spool stowed within each such drawer section of which next adjacent spools respectively have an opposed terminal region of a common continuous fishing line coiled about the respective spool hubs with a medial lead portion disposed to tangentially interconnect the respective outer spool coils and which lead interconnection is concealingly threaded through both contiguous end walls without superficial jacket defacement, said jacket subsequent to being split affording dual containers that each independently inclose their respective wrapped spools therein and which lead connection thereupon becomes exposed to view for selective severance.

EGBERT P. HOYLE.

REFERENCES CITED

The following references are of record in the file of this patent:

UNITED STATES PATENTS

| Number | Name | Date |
|---|---|---|
| 192,883 | Swift | July 10, 1877 |
| 2,184,854 | Spooner | Dec. 26, 1939 |
| 2,205,437 | Ringler | June 25, 1940 |
| 2,287,729 | Fallert | June 23, 1942 |
| 2,500,446 | Worden | Mar. 14, 1950 |